US006226420B1

(12) United States Patent
Hamill

(10) Patent No.: US 6,226,420 B1
(45) Date of Patent: May 1, 2001

(54) NON-INTEGER SCALING OF RASTER IMAGES

(75) Inventor: Carroll Francis Hamill, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/998,490

(22) Filed: Dec. 26, 1997

(51) Int. Cl.[7] ...................................................... G06K 9/32
(52) U.S. Cl. ................................................................ 382/299
(58) Field of Search .................................... 395/102, 110; 382/254, 298, 299, 301, 303, 308, 268, 269

(56) References Cited

U.S. PATENT DOCUMENTS

| | | | |
|---|---|---|---|
| 4,437,122 | | 3/1984 | Walsh et al. ........................... 358/166 |
| 5,258,854 | * | 11/1993 | Eschbach ............................... 358/445 |
| 5,263,136 | * | 11/1993 | Deaguiar et al. ...................... 395/164 |
| 5,270,836 | * | 12/1993 | Kang ....................................... 358/459 |
| 5,387,985 | | 2/1995 | Loce et al. ............................. 358/447 |
| 5,404,411 | * | 4/1995 | Banton et al. ........................... 382/54 |
| 5,467,410 | * | 11/1995 | Bloomberg ............................ 382/100 |
| 5,509,115 | * | 4/1996 | Butterfield et al. ................... 395/147 |
| 5,526,468 | * | 6/1996 | Kolb et al. ............................. 375/102 |
| 5,579,445 | * | 11/1996 | Loce et al. ............................. 395/102 |
| 5,634,088 | * | 5/1997 | Banton ................................... 395/102 |
| 5,724,455 | * | 3/1998 | Eschbach ............................... 382/260 |
| 5,815,605 | * | 9/1998 | Koike ..................................... 382/269 |
| 5,867,612 | * | 2/1999 | Robson .................................. 382/298 |
| 5,870,535 | * | 2/1999 | Duffin et al. ........................... 395/115 |
| 5,920,646 | * | 7/1999 | Kamon ................................... 382/173 |

OTHER PUBLICATIONS

U.S. application No. 08/998,545, Zable et al., filed Dec. 26, 1997.
U.S. application No. 08/998,470, Hamill., filed Dec. 26, 1997.

\* cited by examiner

*Primary Examiner*—Matthew C. Bella
*Assistant Examiner*—Kanji Patel
(74) *Attorney, Agent, or Firm*—Fleit, Kain, Gibbon, Gutman & Bongini; Jose Gutman; Michael J. Buchenhorner

(57) ABSTRACT

A method for scaling a binary image by a non-integer factor with quality enhancement. The method includes the steps of: selecting a pel in an input bitmap which represents the image; selecting a neighborhood centered about the selected pel; comparing the selected neighborhood with a set of preselected image feature patterns representing typical image features; and when the selected neighborhood matches an image feature pattern, writing a block of bits to the output bitmap. The block of bits to be written is obtained by subsampling an image enhancing tile that corresponds to the matched image feature pattern. The size and shape of the block and its destination within the output bitmap are determined by the location of the selected pel within the input bitmap. The process is repeated for each pel within the input bitmap resulting in an output image bitmap which represents a non-integer scaled version of the input bitmap with image quality enhancement. This method is particularly useful for scaling raster font characters from a given input resolution to the resolution required by an output device when the resolution of the output device is a non-integer multiple of the input resolution.

10 Claims, 5 Drawing Sheets

NON-INTEGER SCALING OF RASTER IMAGES

CROSS REFERENCE TO RELATED APPLICATIONS

This application relates to technology similar to that in U.S. patent application Ser. Nos. 08/998,470 and 08/998,545, which were filed concurrently herewith and are assigned to the same entity.

BACKGROUND OF THE INVENTION

The present invention relates to printers and more specifically to a method for operating a printer with non-integer scaling of raster images with print quality enhancement.

Images representing font characters may be stored in what is known as bitmaps. As the name suggests, a bitmap is a mapping of ones and zeroes which indicates the color values that individual picture elements or "pels" within an image will have when displayed by an output device. For example, a value of "1" within a bitmap may indicate that a corresponding picture element will have a color value of black when the image is printed on a black and white printer. A value of "0" may indicate that a corresponding picture element has a color value of white when the image is printed. Some users of printers have print jobs with old font resources, wherein the resolution is, for example, 240 pels per inch. New printers may have resolutions of 300–600 pels per inch. Thus, there is a need for a method and system for scaling images with a resolution of 240 pels per inch to 300 or 600 pels per inch. This problem is not limited to the precise image resolutions mentioned herein, it occurs continually as printer image resolution improves.

A method for enhancement based on matches of image features is described in U.S. Pat. No. 4,437,122, which is incorporated by reference. This patent describes a method of enhancing the resolution and quality of characters. The method involves identifying patterns or "neighbor fields" surrounding selected pels within an input set of pels and enhancing the selected pels based on the features of the surrounding "neighbor field." The process results in a character whose resolution has been increased by a factor of three and whose diagonal and curved strokes have been smoothed.

Another patent in the same technical area is U.S. Pat. No. 5,387,985 which is also incorporated by reference. This patent relates to the use of a plurality of lookup tables wherein each lookup table represents a unique phase relationship between the input and output bitmaps and to the use of an intermediate bitmap with a resolution that is a common multiple of the input and output resolutions to effect non-integer resolution conversion.

However, the prior art is believed to lack the flexibility required for solving the problems of users of printers who have print jobs with old font resources and require non-integer scaling of font characters with quality enhancement.

SUMMARY OF THE INVENTION

Briefly, in accordance with the invention, a method for scaling a binary image from an input bitmap with lower resolution to an output bitmap with higher resolution and improved image quality includes the steps of: selecting a pel in the input bitmap; selecting a neighborhood centered around the selected pel; comparing the selected neighborhood with a set of preselected image feature patterns representing typical image features; and when the selected neighborhood matches an image feature pattern, writing an appropriate block of bits to the output bitmap. The location of the block within the output bitmap is determined by the location of the selected pel within the input bitmap. The size and shape of the block also depend upon the location of the selected pel within the input bitmap. The appropriate block of bits is obtained by subsampling an image enhancing tile which corresponds to the matched image feature pattern.

Subsampling is the process of determining a size and shape for an image enhancing tile based on the location of the corresponding pel in the input bitmap. The process of matching neighborhoods and writing a subsampled image enhancing tile (i.e., block of bits) to the output bitmap is repeated for each pel in the input bitmap. When the image enhancing tiles are subsampled to the proper size and shape and placed in the proper locations in the output bitmap, the jagged "stair-step" look of curved and diagonal image features in the input image is smoothed, resulting in improved quality.

BRIEF DESCRIPTION OF THE DRAWING(S)

DESCRIPTION OF THE ILLUSTRATIVE EMBODIMENT(S)

Figure 1:
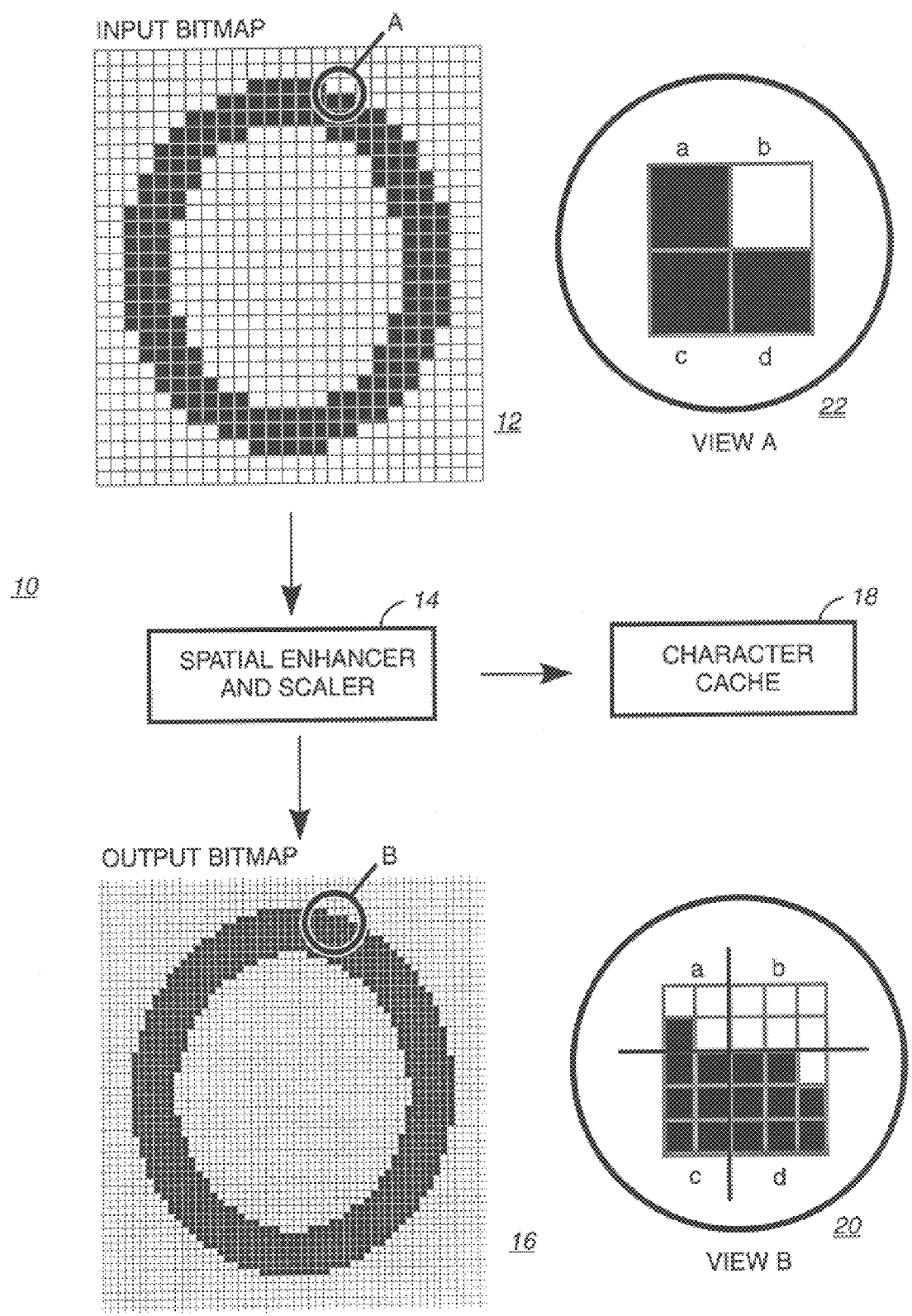
FIG. 1 shows a scaling system in accordance with the invention.

Referring to FIG. 1, there is shown a scaling system 10 in accordance with the invention. Scaling is the process of enlarging or reducing all or part of a display image by establishing a mapping from the set of bits (bitmap) which represents the input image (e.g., a character) to a larger or smaller set of bits which represents the enlarged or reduced output image. To effect image enhancement, some bits within the input bitmap 12 will map to collections of bits in the output bitmap whose elements have values different from the original bits. For example, a bit with value "0" in the input bitmap 12 may map to a collection of bits whose elements have values of "0" or "1". See FIG. 1A. The spatial enhancer and scaler 14 may be implemented with software described herein loaded in printing apparatus, may be resident on ROM or may be a hardwired circuit. The spatial enhancer and scaler 14 implements a method for scaling and enhancing a binary image by a non-integer factor wherein a neighborhood is selected for each pel in the input bitmap. The resulting output bitmap is stored as part of a larger bitmap which constitutes a digital representation of a page to be printed or displayed. This bitmap is then transmitted to the display device (printer) for output. The bitmap may also be stored in any suitable cache memory 18 for possible fast reuse. The scaling system 10 may be implemented by combination of hardware and software (possibly located within a printer). Moreover, the functionality required for using the invention may be embodied in computer-readable media (such as 3.5 inch diskettes) to be used in programming an information-processing apparatus to perform in accordance with the invention.

As an example of how the location, size, and shape of the subsampled image enhancing tile are determined by the location of the selected pel within the input bitmap 12, consider the simple case of a 2×2 region 22 to be mapped into a 5×5 region 20 within the output bitmap 16. The 2×2 input region 22 has four pels (each represented by a corresponding letter - a, b, c, or d). Thus, each pel in the input region maps into a 2×2, 2×3, 3×2 or 3×3 region in the output region 20. For example, pel a maps into the 2×2 region a in the output region.

Consider the case where the input bitmap has a resolution of 240 pels per inch and an output bitmap having a resolution of 600 pels per inch with improved quality is sought. In accordance with one aspect of the invention, a pel is selected in the input bitmap. Then a neighborhood is selected surrounding (or centered about) the selected pel. In this example, the neighborhood is a 5×5 block of bits. The selected neighborhood is then compared with a set of 5×5 bit patterns (image feature patterns) which represent typical image features (e.g., parts of character images). When the selected neighborhood matches an image feature pattern, an appropriately sized block of bits is then written to the proper location in the output bitmap. Every neighborhood is guaranteed to match an image feature pattern since the set of image feature patterns includes two default image feature patterns—one for neighborhoods with white center pels and one for neighborhoods with black center pels. If a selected neighborhood fails to match a non-default image feature pattern, it will match one of the default patterns. The image enhancing tiles corresponding to the default image feature patterns simply represent regions of various shapes which have the same color as the center pel within the input neighborhood.

The image enhancing files corresponding to non-default image feature patterns are chosen such that the coarser regions of diagonal and curved strokes in the input image are smoothed as the character is transformed into a higher resolution, i.e., as the process above is repeated for each pel in the input bitmap. These tiles may contain bits whose values are different from that of the center pel within the bitmap representing the selected neighborhood. This reduces the "stair step" effect characteristic of raster images and improves the quality of the output image.

As the bits in the input bitmap are mapped into the output bitmap, the location, size, and shape of subsampled image enhancing tiles to be written to the output bitmap are determined by the location of the selected pel within the input bitmap. The goal is to create an output bitmap with resolution that is a non-integer multiple of the resolution of the input bitmap and with improved image quality. This is accomplished by tiling together the subsampled image enhancing tiles selected as discussed above by placing them at the proper locations in the output bitmap (i.e., the parts of the output bitmap corresponding to the subsampled part of the input bitmap.) When the selection and placement process described above is repeated for each pel in the input map, an output bitmap is produced which has a resolution which is a non-integer multiple of the resolution of the input bitmap. The quality of the image is also enhanced by this process.

Figure 1A:
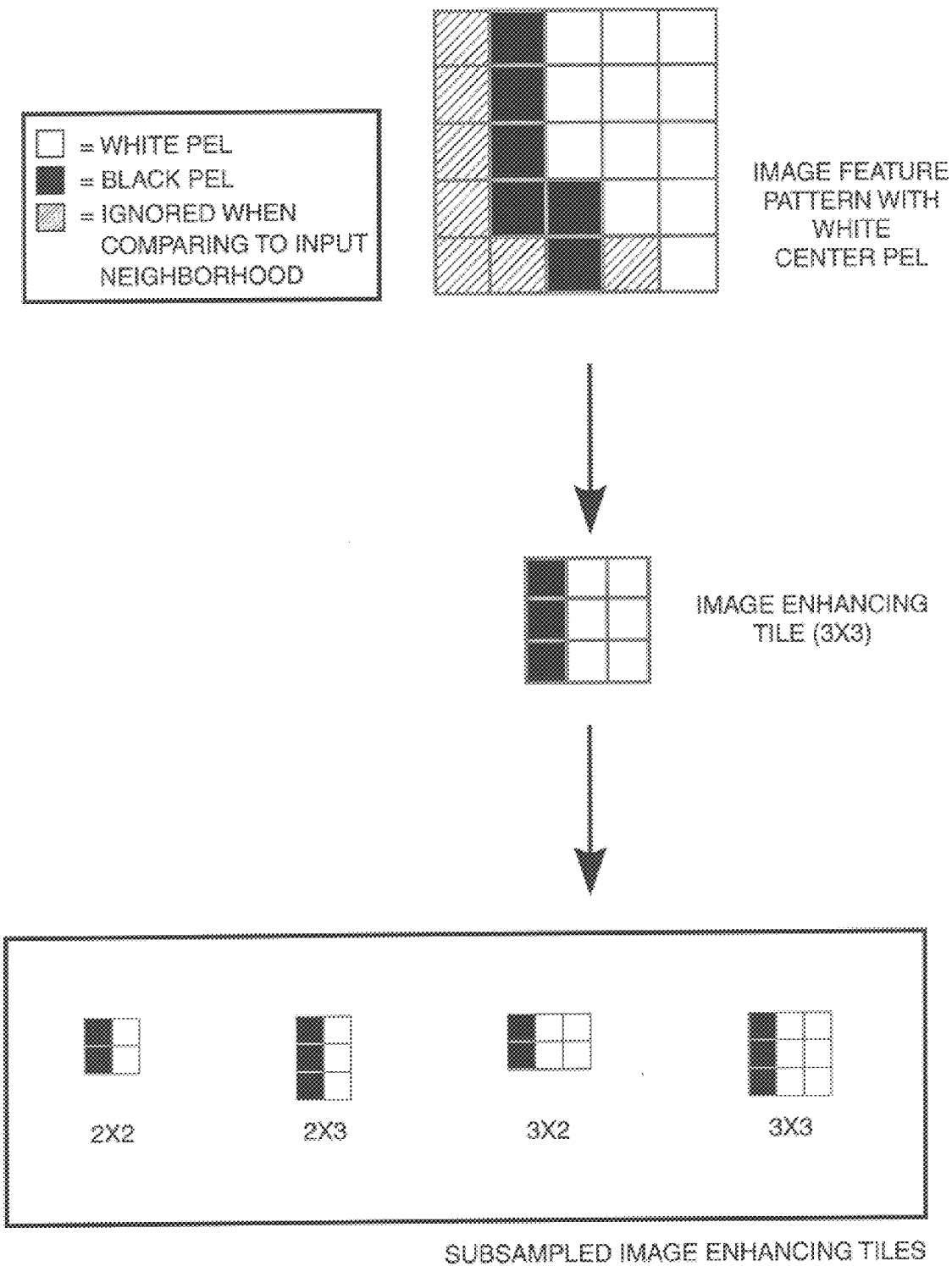
FIG. 1A shows an image feature pattern with a white center pel and its corresponding image enhancing tiles.
Figure 1B:
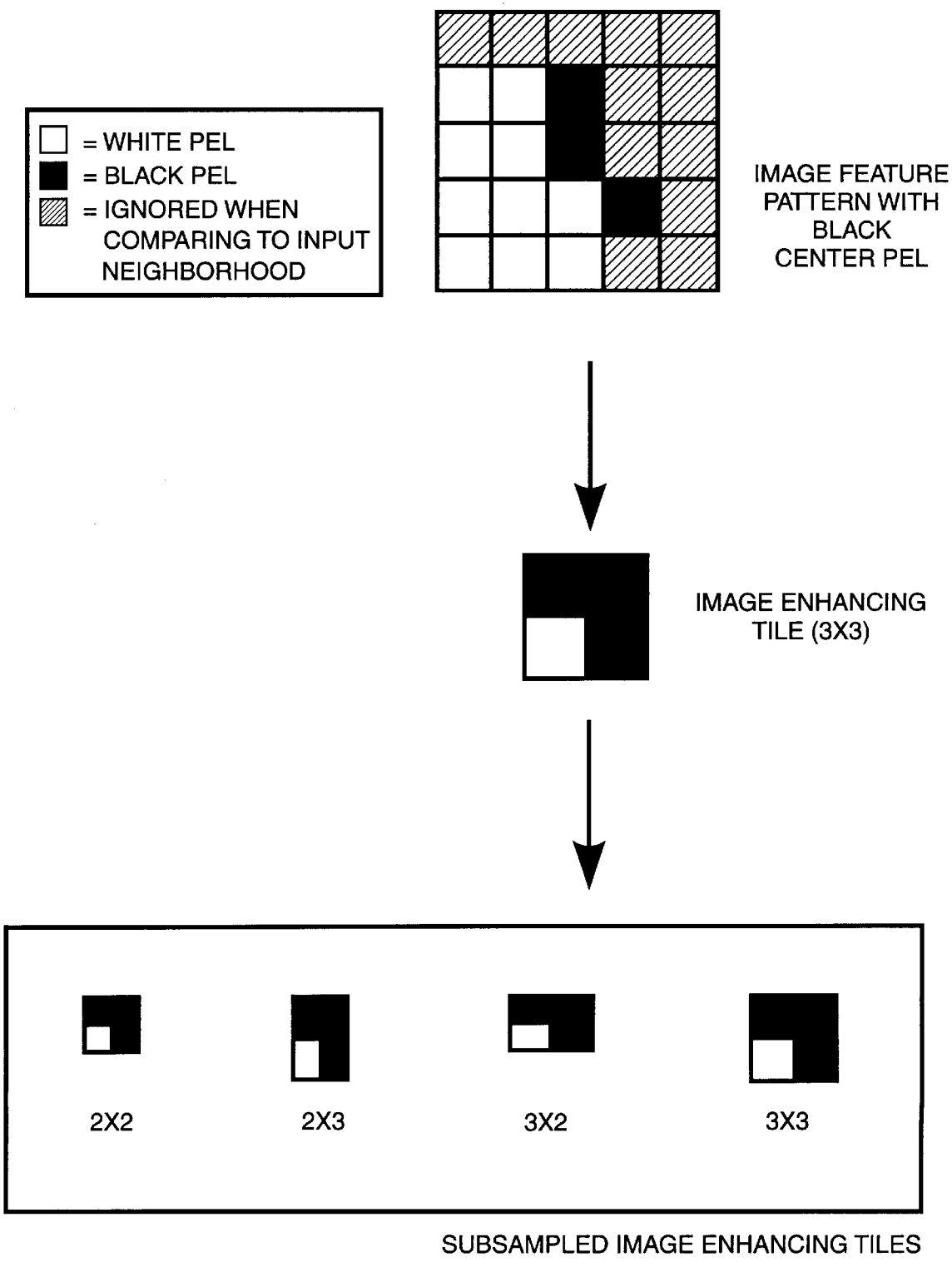
FIG. 1B shows an image feature pattern with a black center pel and its corresponding image enhancing tiles.

Referring to FIGS. 1A and 1B, there are shown two image feature patterns and their corresponding subsampled image enhancing tiles. In FIG. 1A, the center pel is white and in FIG. 1B, it is black. For each image feature pattern, one of four subsampled image enhancing tiles in the aforementioned sizes may be obtained. When a match between a neighborhood and an image feature pattern occurs, an image enhancing tile is selected. This tile is then subsampled (i.e., compared with the input bitmap) based upon the location of the selected pel within the input bitmap to the proper size.

In the embodiment described here, the image enhancing tiles are 3×3 bitmaps which are then subsampled to 2×2, 2×3, or 3×2 bitmaps, as required for creating the output bitmap. If a 3×3 tile is needed for the output, the 3×3 image enhancing tile is written directly to the output, without subsampling. The subsampled image enhancing tile is then written to the proper location in the output. It is not necessary that the resolution of the image enhancing tiles be a common multiple of the input and output resolutions. This process is repeated for all pels in the input. When completed, the process produces an output image that is scaled and enhanced. To accomplish the smoothing, a white pel in the input or a black pel in the input may map to an output region containing one or more white pels.

Figure 2:
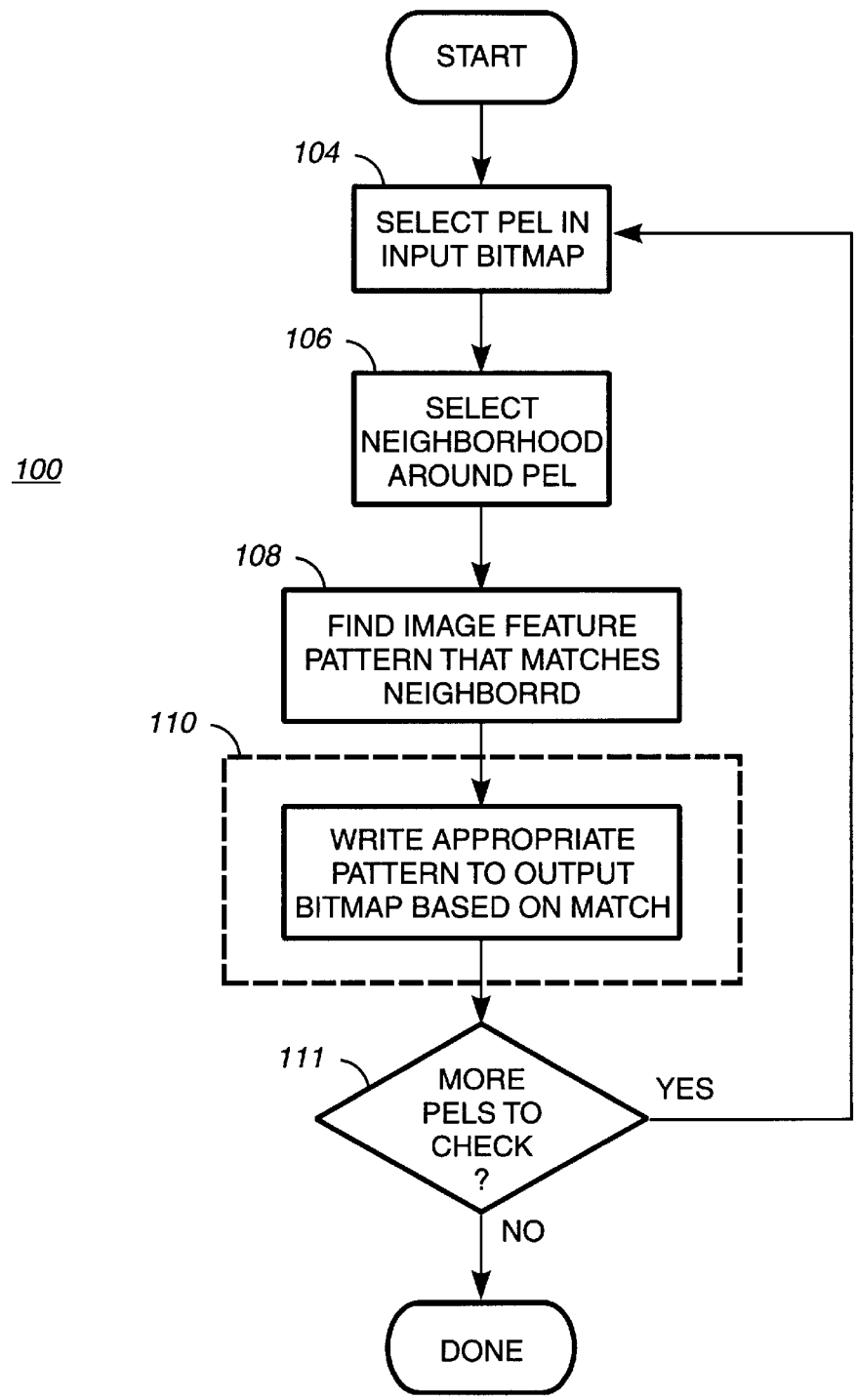
FIG. 2 shows a flow chart of a method in accordance with an aspect of the invention.

Referring to FIG. 2 there is shown a flow chart illustrating a spatial enhancement method 100 in accordance with an aspect of the invention. In step 104, a pel is selected in an input bitmap. Then a neighborhood is selected (step 106) surrounding the selected pel. A search is then performed (step 108), in a given storage location or locations, for an image feature pattern matching the pattern of the selected window. Once a match is found, a subsampled image enhancing tile of proper size and shape is written (step 110) to an output bitmap. A decision 111 is then made on whether there are any additional pels to be checked in the input bitmap. If there are, the process returns to step 104. If there are not, the process is done.

Figure 3:
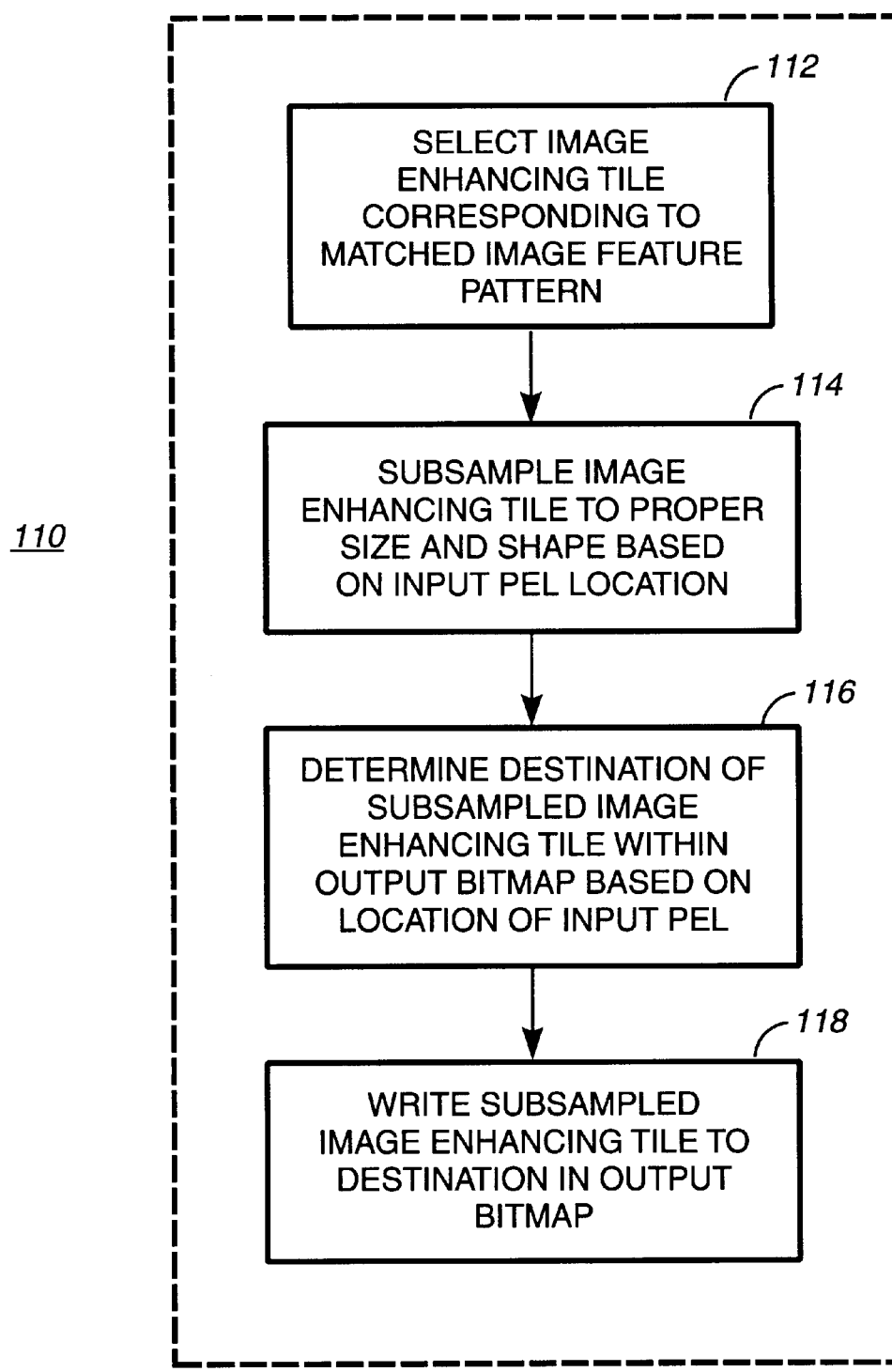
FIG. 3 shows a flow chart of a method in accordance with another aspect of the invention.

FIG. 3 expands on step 110 of method 100 illustrated in FIG. 2. Thus, in accordance with this method, step 110 of method 100 further comprises the steps of selecting (step 112) an image enhancing tile corresponding to the matched image feature pattern to be written to the output bitmap; subsampling (step 114) the image enhancing tile to the proper size; determining (step 116) a destination for the subsampled image enhancing tile within the output bitmap based on the location of the selected input pel; and writing (step 118) the subsampled image enhancing tile to the proper destination in the output bitmap.

In the preferred embodiment, the image feature patterns are stored in two arrays. One for image features with white center pels and one for image features with black center pels. Breaking up the set of image feature patterns in this fashion expedites the search for a match between the selected input neighborhood and an image feature pattern. An array is selected solely on the basis of the color value of the center pel within the selected input neighborhood and is not dependent upon a phase relationship between the input and the output bitmaps. The elements of the array are of sufficient size to contain the bitmaps which represent the image features. When a neighborhood in the input bitmap is selected for comparison with the image feature patterns, certain bits may be ignored in the comparison (see FIGS. 1A and 1B). Therefore, each image feature pattern has a corresponding mask which is used to mask out bits in the selected neighborhood pattern which will be ignored. The masked input pattern is then compared to entries in one of the two image feature pattern arrays. When a match is found, a corresponding image enhancing tile is selected from an array whose elements are of sufficient size to contain the bitmaps which represent the image enhancing tiles. This image enhancing tile is then subsampled to the required size and shape based upon the location of the center pel of the input neighborhood within the input bitmap. The steps of subsampling the image enhancing tile and writing to the output bitmap may be accomplished by masking out unwanted bits in the image enhancing tile and writing the remaining bits into the proper storage locations in the output bitmap under the control of a mask. In the preferred embodiment which scales raster characters by a factor of 2.5 with enhancement, the image enhancing tiles have an effective resolution of three times the input resolution and 6/5 times the output resolution. The resolution of the image enhancing tiles is therefore not a common multiple of the input and output resolutions.

This method may be implemented by software (e.g., in C or Assembler language), as a specialized hardware system, or a combination of both. It may also be useful in the enhancement of simple raster images (line art) and could be extended to other resolution transformations.

While this invention has been illustrated and described in the preferred embodiments, many modifications and changes may be made by those skilled in the art. It is to be understood that the invention is not limited to the precise embodiments described herein.

What is claimed is:

1. A method for scaling an input bitmap to an output bitmap by a non-integer factor with increased resolution and improved image quality, comprising the steps of:

selecting a pel in the input bitmap;

selecting a neighborhood surrounding the selected pel;

searching a set of preselected image feature patterns to find an image feature pattern that matches the selected neighborhood;

selecting an image enhancing tile corresponding to a matched image feature pattern and storing the image enhancing tile as a bitmap having a resolution that is not a common multiple of the input and output resolutions;

creating a subsampled image enhancing tile by subsampling the image enhancing tile to make it a proper size and shape, the size and shape varying, based on the location of the selected pel in the input bitmap;

determining a destination of the subsampled image enhancing tile within the output bitmap based on the location of the selected pel; and writing the subsampled image enhancing tile to the proper destination in the output bitmap.

2. The method of claim 1, wherein the steps of selecting the image enhancing tile and subsampling it to an output pattern of proper size and shape further comprise:

storing the image enhancing tiles as 3×3 pel bitmaps;

writing a 3×3 pel image enhancing tile, corresponding to the selected pel in the input bitmap, to the output bitmap when a 3×3 pel area in the output bitmap is to be filled; and subsampling the 3×3 pel bitmaps to 2×2 pel, 2×3 pel, or 3×2 pel bitmaps based upon the location of the input pel within the input bitmap, when an area other than a 3×3 pel area in the output bitmap is to be filled.

3. The method of claim 1, further comprising the step of:

writing the output bitmap to a cache.

4. The method of claim 1, wherein each of the steps is repeated for each pel within the input bitmap to create an output image bitmap which represents a non-integer scaled version of the input bitmap with image quality enhancement.

5. The method of claim 4 wherein the input bitmap represents a font character and the output bitmap represents a resolution increased version of the same character with image quality enhancement.

6. A computer-readable medium including program instructions for scaling an input bitmap to an output bitmap by a non-integer factor with increased resolution and improved image quality, comprising instructions for:

selecting a pel in the input bitmap;

selecting a neighborhood surrounding the selected pel;

searching a set of preselected image feature patterns to find an image feature pattern that matches the selected neighborhood;

selecting an image enhancing tile corresponding to a matched image feature pattern and storing the image enhancing tile as a bitmap having a resolution that is not a common multiple of the input and output resolutions;

creating a subsampled image enhancing tile by subsampling the image enhancing tile to make it a proper size and shape, the size and shape being variable, based on the location of the selected pel in the input bitmap;

determining a destination of the subsampled image enhancing tile within the output bitmap based on the location of the selected pel; and writing the subsampled image enhancing tile to the proper destination in the output bitmap.

7. The computer-readable medium of claim 6, wherein the instructions for selecting the image enhancing tiles and subsampling it to an output pattern of proper size and shape further comprise:

storing the image enhancing tiles as 3×3 pel bitmaps;

writing a 3×3 pel image enhancing tile, corresponding to the selected pel in the input bitmap, to the output bitmap when a 3×3 pel area in the output bitmap is to be filled; and subsampling the 3×3 pel bitmaps to 2×2 pel, 2×3 pel, or 3×2 pel bitmaps based upon the location of the input pel within the input bitmap, when an area other than a 3×3 pel area in the output bitmap is to be filled.

8. The computer-readable medium of claim 6, further comprising an instruction for:

writing the output bitmap to a cache.

9. The computer-readable medium of claim 6, further comprising instructions for repeating each instruction of claim 6 for each pel within the input bitmap to create an output image bitmap which represents a non-integer scaled version of the input bitmap with image quality enhancement.

10. A system for scaling an input bitmap to an output bitmap by a non-integer factor with increased resolution and improved image quality, comprising:

means for selecting a pel in the input bitmap;

means for selecting a neighborhood surrounding the selected pel;

means for searching a set of preselected image feature patterns to find an image feature pattern that matches the selected neighborhood;

means for selecting an image enhancing tile corresponding to a matched image feature pattern and storing the image enhancing tile as a bitmap having a resolution that is not a common multiple of the input and output resolutions;

means for creating a subsampled image enhancing tile by subsampling the image enhancing tile to make it a proper size and shape, the size and shape being variable, based on the location of the selected pel in the input bitmap;

means for determining a destination of the subsampled image enhancing tile within the output bitmap based on the location of the selected pel; and means for writing the subsampled image enhancing tile to the proper destination in the output bitmap.

* * * * *